United States Patent
Boz, II et al.

(10) Patent No.: US 6,450,454 B1
(45) Date of Patent: Sep. 17, 2002

(54) SPACECRAFT ATTACK AND DISTRESS EJECTABLE RECORDER

(75) Inventors: Wallace S. Boz, II, Palo Alto, CA (US); Yat Fai Leung, Granite Bay, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/752,175

(22) Filed: Dec. 29, 2000

(51) Int. Cl.$^7$ .................................................. B64G 1/22
(52) U.S. Cl. ...................................................... 244/158 R
(58) Field of Search .............................. 244/1 R, 158 R, 244/161, 169

(56) References Cited

U.S. PATENT DOCUMENTS

| | | | |
|---|---|---|---|
| 3,137,458 A | * | 6/1964 | Hagan |
| 3,140,847 A | * | 7/1964 | Ames |
| 3,380,687 A | * | 4/1968 | Wrench et al. |
| 4,679,752 A | * | 7/1987 | Wittmann et al. |
| 4,711,417 A | * | 12/1987 | Steffy |
| 5,508,932 A | * | 4/1996 | Achkar et al. |
| 5,702,069 A | * | 12/1997 | Geyer et al. |
| 5,755,407 A | * | 5/1998 | Aubret et al. |
| 6,024,327 A | * | 2/2000 | Won et al. |

* cited by examiner

Primary Examiner—Charles T. Jordan
Assistant Examiner—Tien Dinh
(74) Attorney, Agent, or Firm—Perman & Green, LLP

(57) ABSTRACT

A space vehicle includes an attachment system for attaching the vehicle to another space vehicle, a memory for storing data concerning the status of the other space vehicle and threats experienced by the other space vehicle, and a transmission system for transmitting data stored in the memory to a planet or a different space vehicle. An ejection system enables the secondary vehicle to be ejected from the primary vehicle when predetermined criteria concerning the status data or the threat data are met. A spin system causes the secondary vehicle to be spin stabilized when ejected from the primary vehicle. When the secondary vehicle is ejected, the nature of the threat or status of the primary vehicle can be determined.

15 Claims, 2 Drawing Sheets

SPACECRAFT ATTACK AND DISTRESS EJECTABLE RECORDER

FIELD OF THE INVENTION

This invention pertains to spacecraft. More particularly, it pertains to a system for communicating information relevant to actual or imminent catastrophic failure of the spacecraft.

BACKGROUND OF THE INVENTION

It is not unusual for spacecraft to include internal telemetry equipment to monitor the state of the vehicle and to transmit data to the earth or another spacecraft. Unfortunately, there have been numerous instances in which a spacecraft, such as a satellite or deep space probe, has been lost without any data being transmitted to another vehicle or to the earth. In such cases, it is impossible for the controllers of the vehicle, to determine the cause of the failure; especially in cases where the vehicle can not be recovered. Other similar failures will inevitably occur if there is no data available to document the reasons for loss of the vehicle. For example, it is difficult, if not impossible to determine the presence of design flaws, much less to correct such flaws, without data pointing to the cause of the problem.

Another possible cause for loss of communication with the space vehicle is an attack by, for example, high-intensity electromagnetic bombardment or explosion. Again, it would be desirable for the controllers of the vehicle to be aware of the nature of such threats so that appropriate protective measures could be taken to protect other vehicles, by, for example, changing their location or trajectory, or by mounting an appropriate counterattack.

SUMMARY OF THE INVENTION

It is an object of the present intention to provide a method and an apparatus for determining the cause of failure of the vehicle, even if that vehicle has been irretrievably lost.

It is another object of the present invention to provide a method and an apparatus for determining whether a vehicle has been lost due to a particular threat or attack.

In accordance with the invention, a system for operating in space comprises a primary vehicle and a secondary vehicle. The secondary vehicle includes a memory for storing data concerning at least one of the status of the primary vehicle and threats experienced by the primary vehicle; and a transmission system for transmitting data stored in the memory to at least one of a planet or another space vehicle. An ejection system causes the secondary vehicle to be ejected from the primary vehicle when predetermined criteria concerning the status data or the threat data are met.

The system may further comprise a spin system for causing the secondary vehicle to be spin stabilized when ejected from the primary vehicle. The spin system may comprise a torsion bar that can be bent to store mechanical energy; and a position lock for holding the secondary vehicle in position so that the torsion bar is bent, and for releasing the secondary vehicle when the secondary vehicle is to be ejected.

Preferably, the secondary vehicle is hardened against threats.

The data include at least one of vehicle identification, status and threat.

Sensors on at least one of the primary vehicle and the secondary vehicle provide data indicative of at least one of status and threat. The primary vehicle may also pass data directly to the secondary vehicle to be used for various purposes such as monitoring or storage.

The sensors may include a first group for providing data indicative of vehicle status and a second group for providing data indicative of threats. The first group of sensors may provide signals indicative of processor clock, power bus voltage, fuel level and thruster operation. The second group of sensors may provide signals indicative of electromagnetic radiation, shock, acceleration and temperature.

In accordance with the invention, a space vehicle may comprise an attachment system for attaching the vehicle to another space vehicle; a memory for storing data concerning at least one of the status of the other space vehicle and threats experienced by the other space vehicle; and a transmission system for transmitting data stored in the memory to at least one of a planet or a different space vehicle when predetermined criteria concerning the status data or the threat data are met.

The invention also comprises a method for operating in space comprising providing a primary vehicle; providing a secondary vehicle, the secondary vehicle including a memory for storing data concerning at least one of the status of the primary vehicle and threats experienced by the primary vehicle; and causing the secondary vehicle to be ejected form the primary vehicle when predetermined criteria concerning the status data or the threat data are met.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
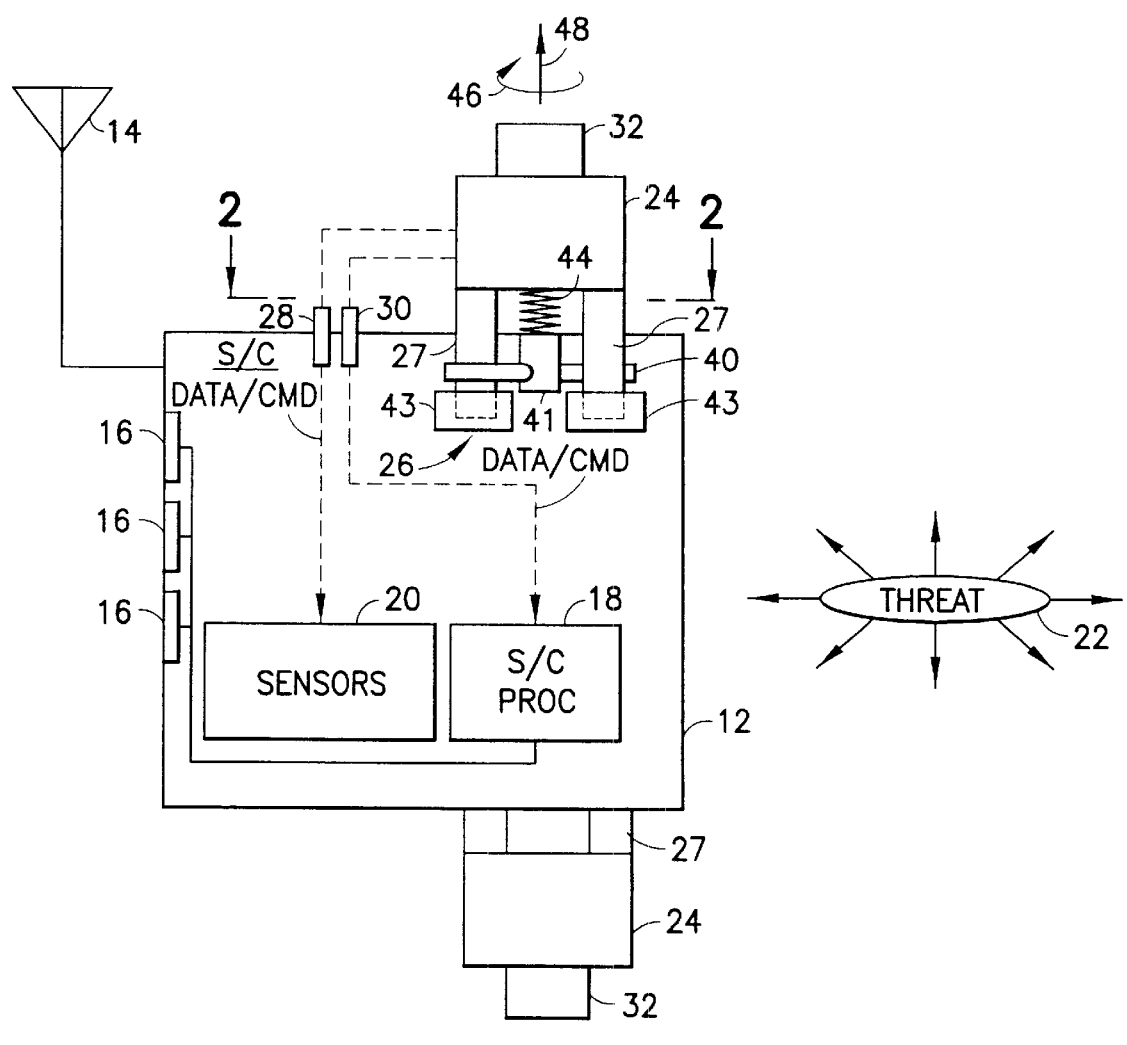
FIG. 1 is a conceptual, pictorial diagram of apparatus in accordance with the invention.

Referring to FIG. 1, a space vehicle such as a satellite 10 has mounted to its enclosure 12 an antenna 14 as well as one or more sensors 16. The external sensor 16 may be, for example, visible or infrared cameras, radiation detectors or spectrometers used by the spacecraft to accumulate the data appropriate to its mission. Data provided by an external sensor 16 or from the primary vehicle (such as from the primary processor) is converted to digital form and processed by a spacecraft processor 18. A transmitter (not shown) then transfers data from processor 18 via antenna 14 to another satellite or to the earth.

In accordance with the invention also contained within spacecraft enclosure 12 are a plurality of sensors 20. The sensors may be divided into two groups. A first group may be useful for monitoring the condition of the spacecraft. For example, one of sensors 20 may be connected to the spacecraft processor 18 to monitor its clock or, in colloquial terms, its heartbeat. Such a sensor will detect whether the processor has stopped functioning.

A second sensor may monitor the voltage of the power bus which powers the spacecraft. If the voltage falls below a predetermined level, this is generally indicative of an imminent failure of the spacecraft's power supply. A sensor will provide an output to record this evident.

A third sensor may be utilized to monitor satellite fuel level. The satellite may be lost, for example, due to the fact that there is no longer fuel on board to control its position or trajectory.

Yet another sensor may monitor thruster operations. It is also possible for the spacecraft to be lost even with adequate fuel on board, because the thrusters do not operate to provide the desired position or trajectory.

A second group of sensors 20 may be used to monitor threats such as an explosive device 22 designed to disable or destroy satellite 10. For example, an electromagnetic sensor may be utilized to monitor for the presence of electromagnetic pulses of high intensity designed to disable or destroy the electronic components within satellite 10. Further, an acceleramator may be used to determine whether the satellite 10 has been impacted by a projectile such as a ballistic device launched to intercept it or part of an exploding body designed to disable or destroy the satellite 10 on impact. Such a sensor provides an output signal indicative of shock or acceleration experienced by the satellite 10.

Yet another kind of threat sensor may be designed to detect the effects of high intensity laser radiation such as high temperatures or the presence of particular wavelengths in the electromagnetic spectrum.

In accordance with the invention, satellite 10 is provided with at least one spacecraft attack and distress ejectable recorder (SADER) or ejectable recorder 24. Each ejectable recorder 24 is attached to the enclosure 12 of satellite 10 by an ejection interface shown generally as 26 (more fully described with respect to FIG. 2). More particularly, each ejectable recorder 24 has attached thereto mounting members 27 which extend into the ejection interface 26. Although only one ejectable recorder 24 may be necessary, as illustrated in FIG. 1 satellite 10 may be equipped with a plurality of ejectable recorders 24. Such multiple units can be placed strategically about the surface of the spacecraft to maximize the chance that one unit will survive a perceived probable attack on the spacecraft. Preferably, for example, one unit may be placed on the earth face and another on the anti-earth face of satellite 10.

While sensors 20 are shown within satellite 10, it will be appreciated that these sensors, or some of the sensors, may also be housed within ejectable recorder 24. For example, at least the threat sensors may be housed in ejectable recorder 24. Regardless of the precise location of sensors 20, it is preferable that the sensors be entirely controlled, monitored and powered by the ejectable recorder 24, which should have its own power supply independent of that of satellite 10. However, while satellite 10 and ejectable recorder 24 are coupled together, it is possible for ejectable recorder 24 to be powered by the power supply of satellite 10.

If sensors 20 are aboard satellite 10, they can be interfaced to ejectable recorder 24 via an electrical connector 28 of the type supplied by G&H Technology, Inc. of Camarillo, Calif. Such connectors are typically used to provide electrical connections between different stages of missiles prior to their separation in flight.

Other data may be provided to ejectable recorder 24 through a separate electrical connector 30 as shown in FIG. 1 or through a different portion of connector 28. Connector 30 provides the above-mentioned sensor outputs which are indicative of the health and status of the satellite 10 and its power systems. A predetermined length of time of such data and other telemetry data associated with the mission of the spacecraft may be provided to ejectable recorder 24. For example, all such data accumulated within ten minutes prior to ejection may be loaded into a memory (not shown) in ejectable recorder 24.

Data from sensors 24 indicative of a threat may also be processed by spacecraft processor 18. If this data, or telemetry data indicative of the status of the spacecraft indicates that the spacecraft has been exposed to a threat, or is about to be exposed to a threat, or may be irretrievably lost, software associated with spacecraft processor 18 can issue a command to cause ejectable recorder or recorders 24 to be ejected from the spacecraft as more fully described below. Once ejected, and until its power supply is exhausted, each ejectable recorder 24 will continuously broadcast to the ground or to other satellites all telemetry it collected, including threat identification in the past predetermined time interval, the last message sent by the spacecraft processor 18 of satellite 10, as well as any other pre-recorded message such as spacecraft identification. This will occur regardless of the reason for ejection (threat or failure).

A transmitter (not shown) located in ejectable recorder 24 feeds energy to an omni-directional broadcast antenna 32.

Figure 2:
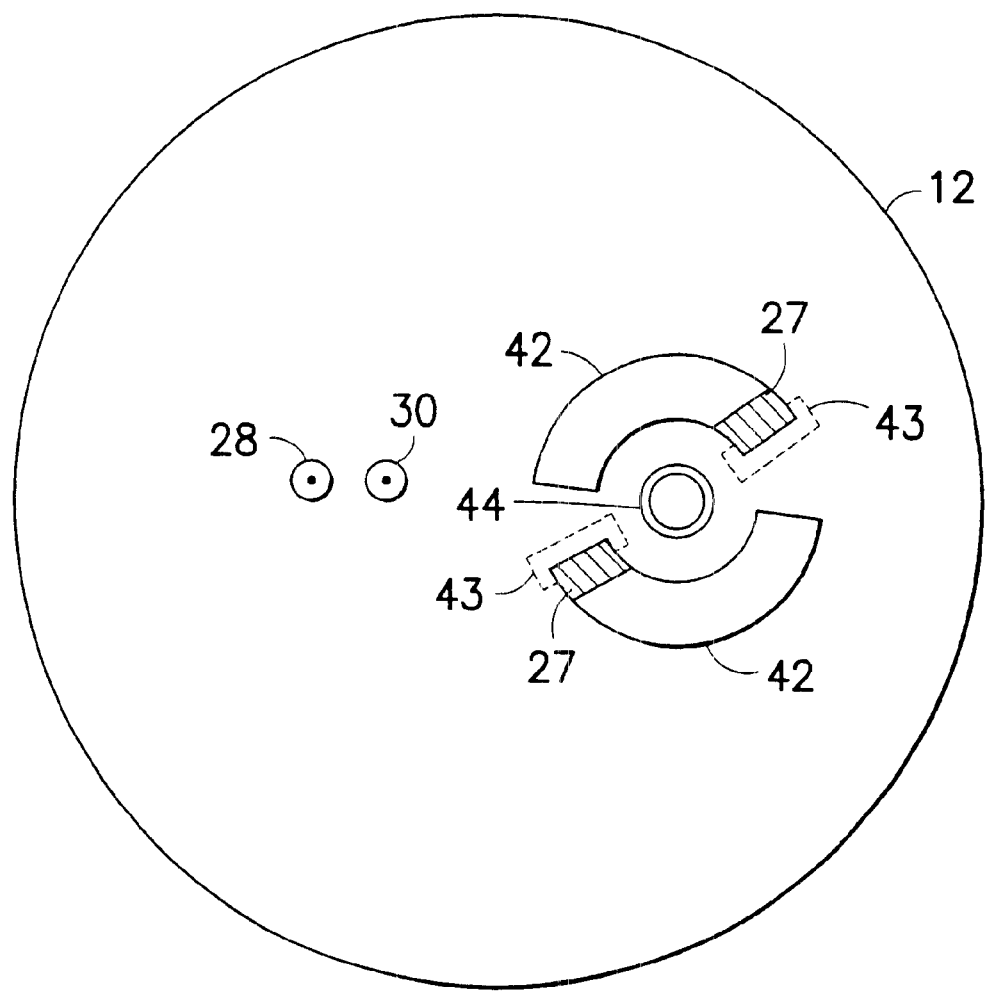
FIG. 2 is a plan view, taken along line 2—2 of FIG. 1, illustrating the ejectable interface of FIG. 1.

Referring to FIG. 2, ejection interface 26 may include an elongated bar 40 extending through a slot (not shown) in a post 41. Each mounting member 27 fits into a slot 42 in enclosure 12 of satellite 10. One of two locking members 43 each engages one mounting member 27, as more fully described below. When ejectable recorder 24 is attached to satellite 10, it is put in place and a stiff coil spring 44 is compressed. Ejectable recorder 24 is then twisted in place in the direction of arrow 45 so that bar 40 is bent as shown in FIG. 2 and locking members 43 engage mounting members 27. When an ejection command is received, locking member 43, which may be electromechanically activated, by, for example an electrical signed from processor 10, are caused to release mounting members 27. When this happens, bars 40 cause ejectable recorder 24 to spin about its own longitudinal axis 46 as indicated by arrow 48. Spring 44, compressed by placement of ejectable recorder 24 on satellite 10, expands, thus imparting a velocity to ejectable recorder 24 in the direction of longitudinal axis 48, away from satellite 10 at the same time that it is caused to spin by the bars 40. Thus, ejectable recorder 24 is spin stabilized as it is ejected from satellite 10.

It will be recognized by one skilled in the art that release and spin systems other than those illustrated, may be employed. For example, ejectable recorder 24 may be connected to housing 12 of satellite 10 by exploding bolts to effectuate its release. Further, both spin and acceleration away from satellite 10 may be caused by suitable thrusters, including those using a small amount of solid fuel, attached to ejectable recorder 24, in view of the one time use nature of the application.

Preferably, ejectable recorder 24 is suitably battle hardened so that it itself is not easily damaged by electromagnetic radiation or impact, assuming it is ejected in a timely fashion. Information is relayed to the ground or another satellite to ascertain the nature of the threat that caused the ejectable recorder or recorders 24 to be ejected or the nature of the failure of the spacecraft through reasons other than a threat or attack. It is also possible that ejection of ejectable recorders 24 may be triggered by a signal from the ground received by antenna 14.

What is claimed is:

1. A system for operating in space comprising:
   a primary vehicle;
   a secondary vehicle, said secondary vehicle including a memory for storing data concerning at least one of the status of the primary vehicle and threats experienced by the primary vehicle; and a transmission system for transmitting data stored in the memory to at least one of a planet or another space vehicle;

an ejection system for causing the secondary vehicle to be ejected from the primary vehicle when predetermined criteria concerning said status data or said threat data are met; and a spin system for causing the secondary vehicle to be spin stabilized when ejected from the primary vehicle including:

an elongated bar that can be bent to store mechanical energy; and a position lock for holding the secondary vehicle in position so that said bar is bent, and for releasing said secondary vehicle when said secondary vehicle is to be ejected.

2. The system of claim 1, wherein the secondary vehicle is hardened against threats.

3. The system of claim 1, wherein the data include at least one of vehicle identification, status and threat.

4. The system of claim 1 further comprising sensors on at least one of the primary vehicle and the secondary vehicle for providing data indicative of at least one of status and threat.

5. The system of claim 4 wherein said sensors include a first group for providing data indicative of vehicle status and a second group for providing data indicative of threats.

6. The system of claim 5 wherein said first group comprises at least one of sensors providing signals indicative of processor clock, power bus voltage, fuel level and thruster operation.

7. The system of claim 5 wherein said second group comprises at least one of sensors providing signals indicative of electromagnetic radiation, shock, acceleration and temperature.

8. A space vehicle comprising:

an attachment system for attaching the vehicle to another space vehicle;

a memory for storing data concerning at least one of the status of the other space vehicle and threats experienced by the other space vehicle;

a transmission system for transmitting data stored in the memory to at least one of a planet or a different space vehicle when predetermined criteria concerning said status a data or said threat data are meet; and a spin system for causing the secondary vehicle to be spin stabilized when ejected from the primary vehicle, the spin system including:

an elongated bar that can be bent to store mechanical energy; and a position lock for holding the secondary vehicle in position so that said bar is bent, and for releasing said secondary vehicle when said secondary vehicle is to be ejected.

9. The vehicle of claim 8, further comprising:

an ejection system for causing the secondary vehicle to be ejected from the primary vehicle when predetermined criteria concerning said status data or said threat data are meet.

10. A vehicle according to claim 8, hardened against threats.

11. The vehicle of claim 8, wherein the data include at least one of vehicle identification, status and threat.

12. The vehicle of claim 8 further comprising sensors for supplying data indicative of at least one of status and threat.

13. The vehicle of claim 12, wherein said sensors include a first group for providing data indicative of vehicle status and a second group for providing data indicative of threats.

14. The vehicle of claim 13, wherein said first group comprises at least one of sensors providing signals indicative of processor clock, power bus voltage, fuel level and thruster operation.

15. The vehicle of claim 13, wherein said second group comprises at least one of sensors providing signals indicative of electromagnetic radiation, shock, acceleration and temperature.

\* \* \* \* \*